United States Patent [19]

Tanaka et al.

[11] Patent Number: 5,086,312

[45] Date of Patent: Feb. 4, 1992

[54] VARIABLE FOCAL LENGTH CAMERA WITH FOCUS ADJUSTING DEVICE

[75] Inventors: Yasuhiko Tanaka; Takao Koda, both of Saitama; Yoshihiro Ide, Tokyo; Akio Ohmiya, Saitama; Masanoshin Komori, Saitama; Masaya Nozawa, Saitama; Shiro Hashimoto, Saitama; Tetuo Nishizawa, Saitama, all of Japan

[73] Assignee: Fuji Photo Film Co., Ltd., Kanagawa, Japan

[21] Appl. No.: 576,027

[22] Filed: Aug. 31, 1990

[30] Foreign Application Priority Data

Aug. 31, 1989 [JP] Japan .................................. 1-102226
Aug. 31, 1989 [JP] Japan .................................. 1-102227
Sep. 8, 1989 [JP] Japan .................................. 1-105663

[51] Int. Cl.[5] ............................................. G03B 1/18
[52] U.S. Cl. ............................................... 354/195.12
[58] Field of Search ...................... 354/195.1, 195.12; 350/247, 422, 437; 355/55, 58

[56] References Cited

U.S. PATENT DOCUMENTS 4,307,950 12/1981 Suzuki et al. .................... 354/195.1
4,725,864 2/1988 Ogawa et al. .................. 354/195.12
4,789,875 12/1988 Wakabayashi et al. .......... 354/195.1

*Primary Examiner*—L. T. Hix
*Assistant Examiner*—Howard B. Blankenship
*Attorney, Agent, or Firm*—Young & Thompson

[57] ABSTRACT

A variable focal length camera having at least one auxiliary lens system which is inserted into or withdrawn from the optical axis of a main lens system. A lens holder holding the auxiliary lens system is swingably mounted on a shaft extending in the direction of the optical axis, and moves forward and rearward along the shaft for focus adjustment. In order to cancel the component of a force in the direction of the optical axis exerted by a tool by which a focus adjusting device is operated, the shaft is arranged to be motionless in the direction of the optical axis. According to a preferred embodiment, on the intermediate portion of the shaft, there is formed a thread meshing with a base portion of the lens holder so that the position of the lens holder is adjusted through rotation of the shaft, and after this lens position adjustment the base portion is fixed to the shaft.

24 Claims, 7 Drawing Sheets

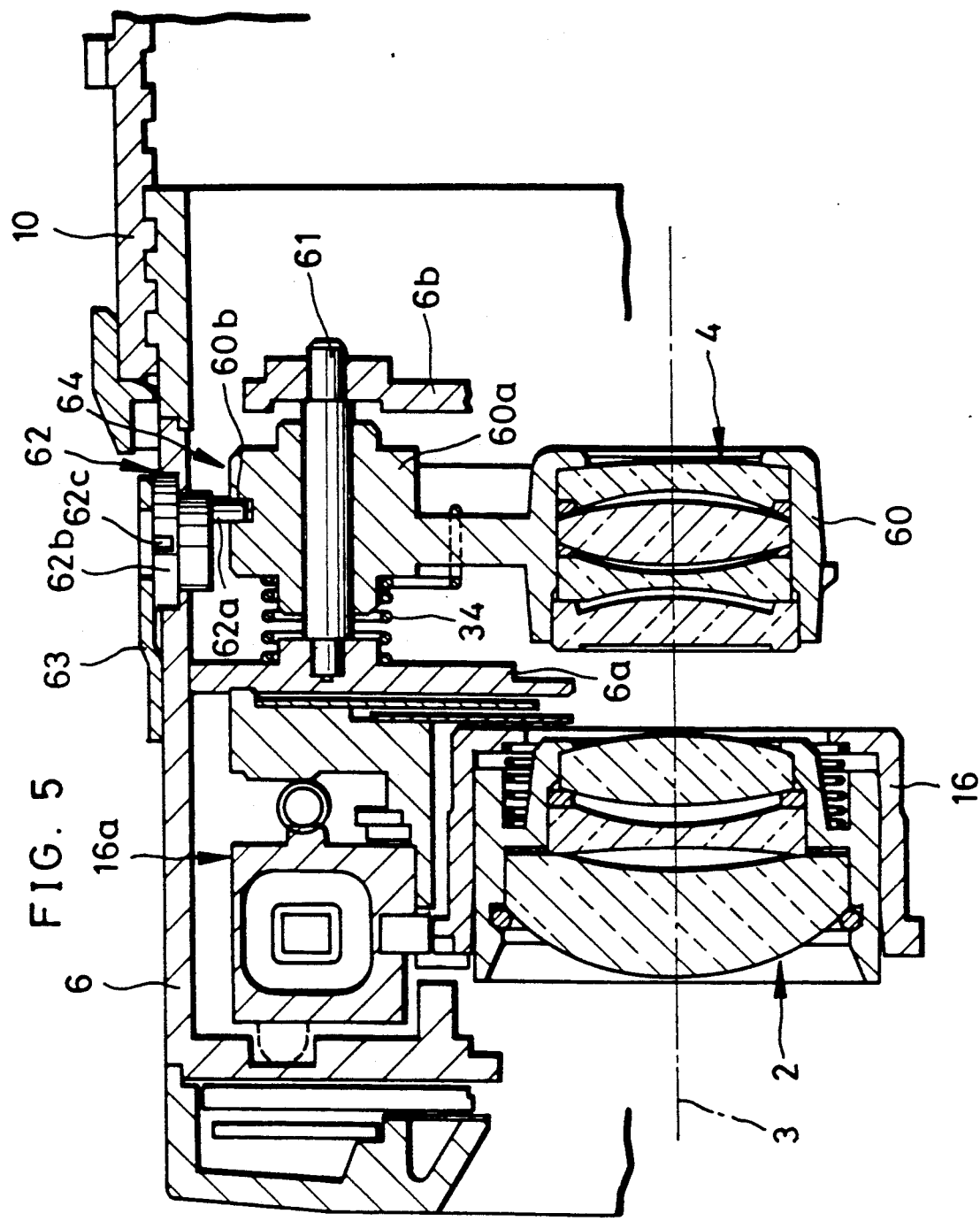

VARIABLE FOCAL LENGTH CAMERA WITH FOCUS ADJUSTING DEVICE

BACKGROUND OF THE INVENTION

The present invention relates to a variable focal length camera capable of changing the focal length of a taking lens between at least two values. More particularly, the invention relates to improvements in focus adjusting devices for setting a lens system of the taking lens at a reference lens position when a taking lens is assembled.

The taking lens of a variable focal length camera is comprised of a main lens system and at least one auxiliary lens system which is inserted into and withdrawn from a photo-taking optical axis. The taking lens has at least two optical lengths selectively used, e.g., a relatively short focal length for wide angle photography and a relatively long focal length for telephotography. In wide angle photography, only the main lens system (front lens group) is present on the photo-taking optical axis, and light from an object passes through the main lens system and impinges upon a photographic film. In telephotography, the auxiliary lens system (rear lens group) is inserted into the photo-taking optical axis, and light from an object passes through the main and auxiliary lens systems and impinges upon a photographic film.

After assembling a taking lens in a camera, the focal point of the lens system of the taking lens is adjusted. According to this focus adjustment, called back focus adjustment, the lens system of the taking lens is set at a reference lens position or an initial lens position such that an object at an infinite distance may be properly focussed on an imaging plane wherein a photographic film is located. As a practical matter, the object to be focussed is placed at a sufficiently great finite distance, for example 10 m, instead of the infinite distance.

Focus adjustment for a variable focal length camera is provided for two modes comprising telephotography and wide angle photography. For focus adjustment for wide angle photography, the main lens system is moved to a wide angle photography lens position by a focal length changeover mechanism, and thereafter the position of the main lens system is finely adjusted so that an image of an object at a predetermined distance such as 10 m may be formed most sharply on the imaging plane. In order to adjust the focus for telephotography, the main lens system is next moved to a telephotography lens position by the focal length changeover mechanism and the auxiliary lens system is inserted into the phototaking optical axis. Then, a lens position of the auxiliary lens system is finely adjusted so as to achieve a sharp focus.

As disclosed for example in U.S. Pat. No. 4,307,950 and U.S. Pat. No. 4,725,864, a conventional focus adjusting device uses an adjusting screw against which a lens holder of an auxiliary lens system abuts, under the biassing force of a spring. The lens holder is fixedly mounted on a rotary shaft which is supported at spaced fixed sections rotatably and movably in the axial direction. By rotating the adjusting screw by means of a screwdriver, the lens holder as well as its rotary shaft is moved in the photo-taking optical axis direction against the spring force thereby finely t adjust the position of the auxiliary lens system. However, when the screwdriver is applied to the adjusting screw and is pushed so as to start rotating it, the lens holder is moved parallel to the photo-taking optical axis by an amount corresponding to the backlash of the screw. When the screwdriver is detached from the screw after completion of focus adjustment, the adjusting screw, now free from the screwdriver, will move backward by an amount corresponding to the backlash by the action of the lens holder which is biassed by the spring. The reference lens position of the auxiliary lens system is therefore displaced by an amount corresponding to the backlash. Adjustment work must therefore be performed having regard for such displacement, and of course this requires skilled technique.

OBJECTS OF THE INVENTION

Therefore, it is a principal object of the present invention to provide a variable focal length camera the focus of which can be adjusted correctly and easily.

It is another object of this invention to provide a variable focal length camera of the type in which a lens system is not susceptible to direct displacement in the photo-taking optical axis direction by a force applied while adjusting the focus.

SUMMARY OF THE INVENTION

The foregoing and other objects and advantages of the present invention are achieved by providing that the force applied to the focus adjusting member by a tool will not directly act upon the lens system with a component of force in the direction of the photo-taking optical axis. According to a preferred embodiment of this invention, at the intermediate portion of a shaft allowed only to rotate, a male thread is formed which is in mesh with a female thread formed on a lens holder. A tool is applied to one end of the shaft extending parallel to the photo-taking optical axis, and rotated to finely adjust the position of the lens holder. Thereafter, the lens holder and the shaft are fixed together by means of an adhesive agent or a screw.

According to another preferred embodiment, a male thread formed on an intermediate portion of a shaft is in mesh with an adjusting nut with which a lens holder is combined. For focus adjustment, the adjusting nut and the shaft are rotated relative to each other to finely adjust the position of the lens holder.

According to a further preferred embodiment of this invention, a cam groove is formed on a lens holder which is mounted on a shaft. Fitted in the cam groove is a pin mounted on an adjusting member which rotates about an axis perpendicular to the photo-taking optical axis.

According to the present invention, although a jig is used for operating a focus adjusting member, there is generated no force directly acting on the lens holder in a direction parallel to the photo-taking optical axis. Accordingly, when the tool is detached from the focus adjusting member, the lens system of the taking lens will not be displaced parallel to that axis. In other words, the position of the lens system will not change between when the tool is applied to the focus adjusting member and when the tool is detached therefrom; and this allows rapid and proper focus adjustment. According to the present invention, the lens holder is slid along the shaft to set the lens system at the reference lens position, thereby providing simple structure and ease of adjustment.

BRIEF DESCRIPTION OF THE DRAWINGS

The above and other objects and advantages of this invention will become apparent to persons skilled in the art from the following detailed description of the preferred embodiments when read in conjunction with the accompanying drawings, in which:

FIG. 5 is an enlarged cross sectional view showing the taking lens according to another embodiment of this invention wherein the lens holder is moved by a cam mechanism;

DETAILED DESCRIPTION OF THE PREFERRED EMBODIMENTS

Figure 1:
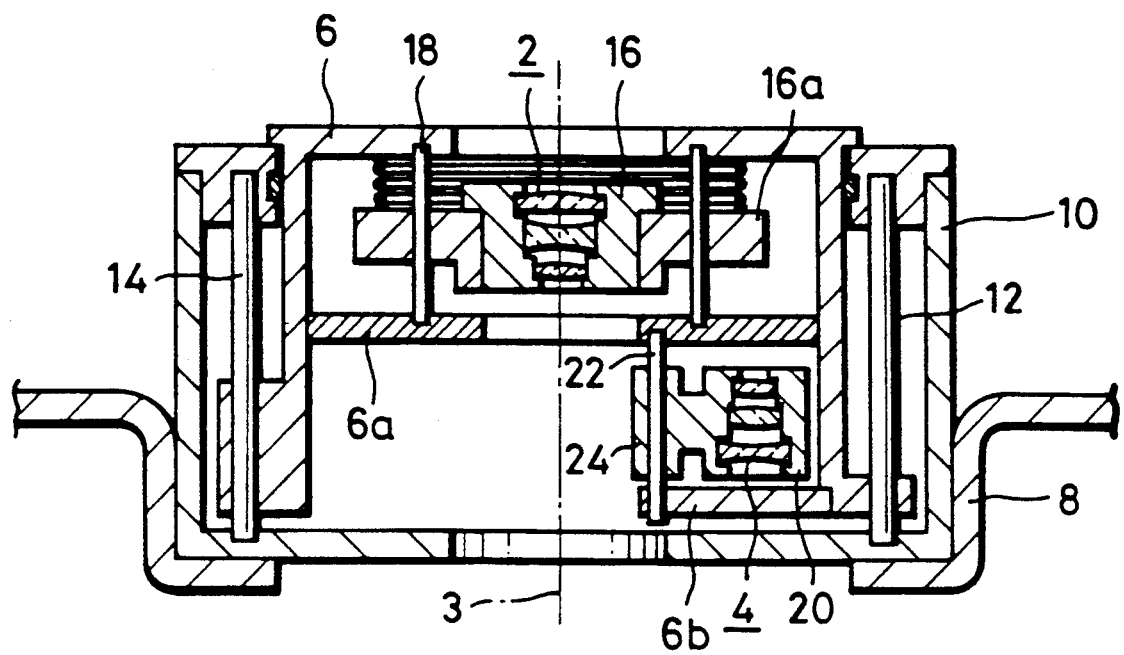
FIG. 1 is a fragmentary cross sectional view in a horizontal plane that includes the axis of a taking lens, showing the lens system of a variable focal length camera of this invention, with the taking lens in the wide angle photography mode.

Referring to FIG. 1 showing a wide angle photography mode, a main lens system 2 is located along a photo-taking optical axis 3, whereas an auxiliary lens system (conversion lens system) 4 is retracted from the optical axis 3. The main and auxiliary lens systems 2 and 4 are mounted within a movable lens barrel 6. This movable lens barrel 6 is movably housed within a stationary lens barrel 10 secured to a camera body 8. Two guide rods 12 and 14 mounted within the stationary lens 10 support the movable lens barrel 6 for movement along the photo-taking optical axis 3.

The main lens system 2 is mounted on a lens frame 16 which is supported by two guide rods 18 mounted on the movable lens barrel 6. The guide rods 18 and lens frame 16 are coupled together via a main lens focus adjusting device 16a. The main lens focus adjusting device 16a is manipulated so as to set the main lens system 2 at a reference lens position or an initial lens position for properly focussing an object at a predetermined distance such as 10 m on an imaging plane.

The auxiliary lens system 4 is mounted on a lens holder 20 which is supported by a rotary shaft 22 mounted on the movable lens barrel 6. The shaft 22 and lens holder 20 are coupled together via an auxiliary lens focus adjusting device 24. The auxiliary lens focus adjusting device 24 is manipulated so as to set the auxiliary lens system 4 at a reference lens position or an initial lens position for properly focussing an object at a predetermined distance such as 10 m on an imaging plane. In the telephotography mode, the lens holder 20 swings with the shaft 22 to cause the auxiliary lens system 4 to enter the photo-taking optical axis 3.

In the wide angle photography mode shown in FIG. 1, the movable lens barrel 6 is moved back to the camera body 8, and the auxiliary lens system 4 is withdrawn from the photo-taking optical axis 3. Therefore, light passing only through the main lens system impinges on a photographic film (not shown) positioned in an imaging plane.

Figure 2:
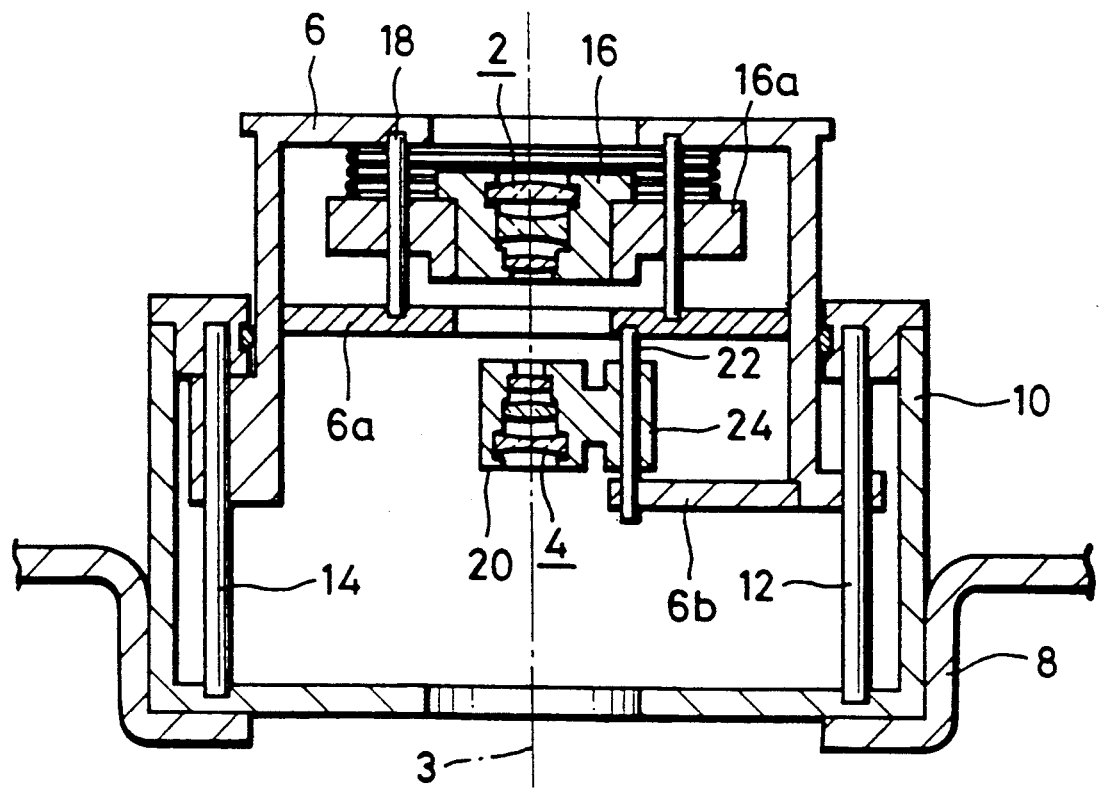
FIG. 2 is a view similar to FIG. 1 wherein the taking lens is in the telephotography mode.

As shown in FIG. 2, in the telephotography mode, the movable lens barrel 6 projects from the camera body 8, and the auxiliary lens system 4 enters the photo-taking optical axis 3. Therefore, light passing through both the lens systems 2 and 4 impinges on the photographic film.

Figure 3:
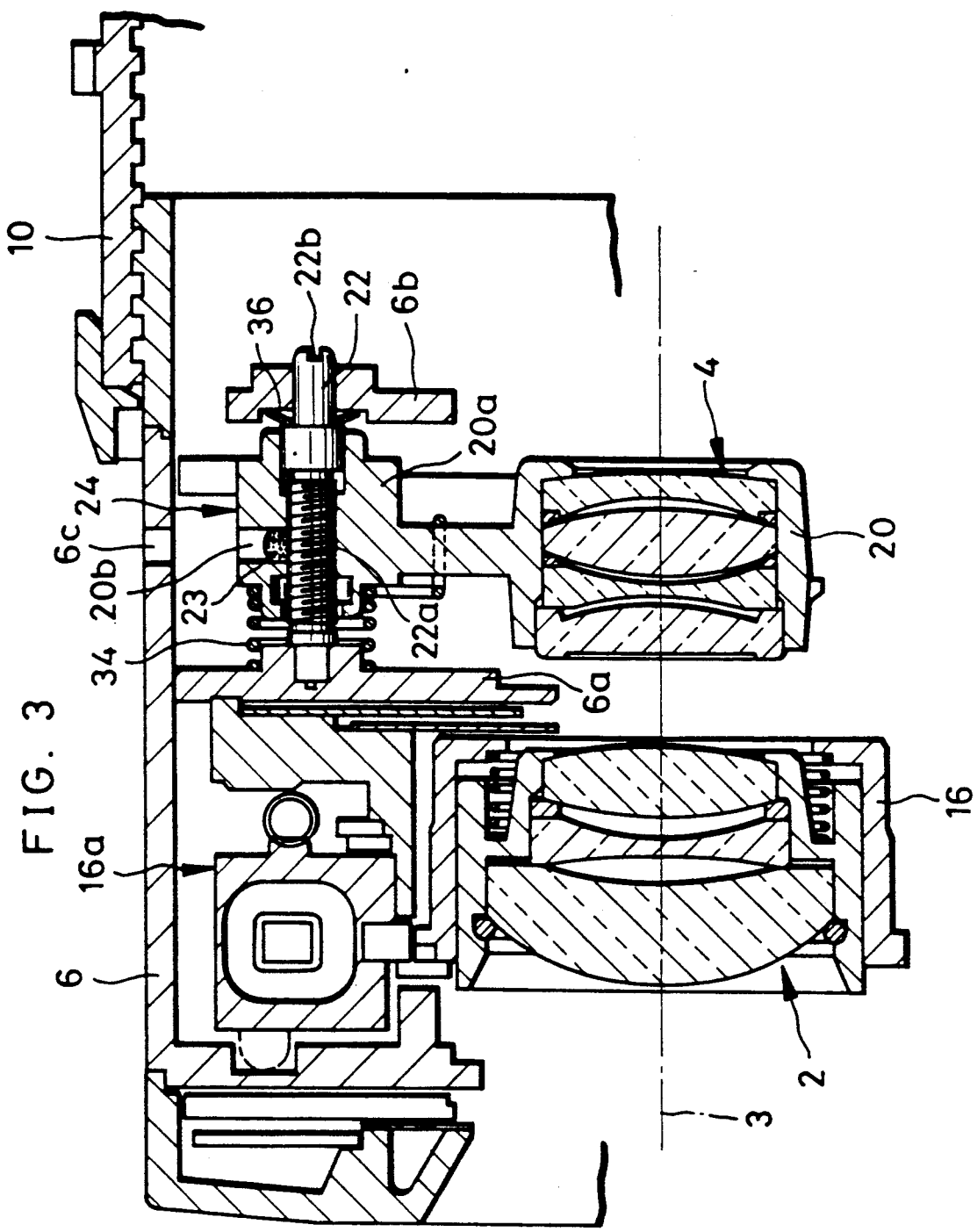
FIG. 3 is an enlarged cross sectional view in a vertical plane that includes the axis of the taking lens shown in FIG. 1, showing the details thereof.

Referring to FIG. 3 showing the details of the auxiliary lens focus adjusting device 24, the shaft 22 is disposed substantially in parallel with the photo-taking optical axis 3 and is rotatable relative to the movable lens barrel 6, and while remaining motionless in a direction parallel to the photo-taking optical axis 3 it is pivotably mounted at its opposite ends between a wall 6a of the movable lens barrel 6 and a lid 6b for covering the movable lens barrel 6. In practice, it is difficult to produce the shaft 22 so that it has precise dimensions, and to fit it properly between the wall 6a and the lid 6b so as to maintain it motionless parallel to the photo-taking optical axis 3. Therefore, a washer spring 36 is disposed between the shaft 22 and the lid 6b to press the shaft 22 against the wall 6a to compensate the difference between the length of the shaft 22 and the distance between the wall 6a and lid 6b. The direction of the force exerted by the spring 36 is the same as that when a tool such as a screwdriver is applied to the shaft 22, with the result that the shaft 22 is prevented from being moved in the axial direction by the tool. A male thread 22a is formed in the intermediate outer periphery of the shaft 22, and the male thread 22a is in mesh with a female thread formed in a base portion 20a of the lens holder 20. The shaft 22 is formed at its rear end with a slot 22b into which a tool can be fitted.

A driver spring 34 acts between the movable lens barrel 6 and lens holder 20. The driver spring 34 applies its spring force in torsion to the lens holder 20 such that the auxiliary lens system 4 is urged to move into the photo-taking optical axis 3. Since the driver spring 34 also urges the lens holder 20 to move backward, any small backlash between the male thread 22a and female thread is absorbed.

An injection hole 20b is formed in the base portion 20a of the lens holder 20. Adhesive agent 23 is deposited in the injection hole 20b to fixedly attach the lens holder 20 to the shaft 22 after the auxiliary lens system 4 is set at the reference lens position. In order to inject adhesive agent 23, a hole 6c is formed on the movable lens barrel 6 in approximate alignment with the injection hole 20b.

To assemble the auxiliary lens focus adjusting device, the shaft 22 is threaded through the lens holder 20 and set at a proper position. After the driver spring 34 is coupled to the shaft 22, the front end of the shaft 22 is next fitted in a hole formed in the wall 6a of the movable lens barrel 6. After the plate spring 36 is placed on the shaft 22, the rear end of shaft 22 is fitted in a hole formed in the lid 6b. Then the lid 6b is fixedly attached to the movable lens barrel 6 by means of screws or the like.

Focus adjustment of the taking lens system will be described next. As shown in FIG. 1, the movable lens barrel 6 is set in the wide angle photography mode by means of a focal length changeover mechanism (not shown). The main lens focus adjusting device 16a is operated to move the lens frame 16 holding the main lens system 2 slightly forward or backward along the photo-taking optical axis 3 within the movable lens barrel 6. By this focus adjustment operation, the main lens system 2 is set at the reference lens position wherein an object at the predetermined distance can be focussed properly, and thereafter the main lens focus adjusting device 16a is fixed.

After completion of focus adjustment for the wide angle photography mode, the movable lens barrel 6 is advanced to the telephotography mode position shown in FIG. 2 by means of the focal length changeover mechanism. After the advancement of the movable lens barrel 6, the lens holder 20 swings around the shaft 22 by the force of the driver spring 34 until it comes into contact with a stop (not shown), thereby to move the auxiliary lens system 4 into the photo-taking optical axis 3. The tip of a tool such as a screwdriver is inserted from the rear of the camera body 8 into the slot 22b of the shaft 22, and rotated so that the shaft 22 is caused to be rotated without shifting in the axial direction. Since the lens holder 20 is precisely positioned by means of the driver spring 34 and the non-illustrated stop, the lens holder 20 meshing with the male thread 22a moves forward or backward along the photo-taking optical axis 3 depending upon the direction of rotation of the shaft 22. The position of the lens holder 20 along the photo-taking optical axis 3 is adjusted such that an object at a predetermined distance is focussed properly by the main lens and auxiliary lens systems 2 and 4.

The shaft 22 is not moved parallel to the photo-taking optical axis 3 upon the application of force by a tool. Accordingly, when the tool is detached from the shaft 22, the lens holder 20 will not move even slightly along the photo-taking optical axis 3 as has been otherwise the case of a conventional focus adjusting device. The auxiliary lens system 4 is therefore free from the action of any component of force exerted by the tool in the direction of the photo-taking optical axis, so that it is correctly held in the reference lens position. After setting the auxiliary lens system 4 at the reference lens position, the tip of a syringe is inserted via the hole 6a into the injection hole 20b to inject adhesive agent 23 from the syringe into the injection hole 20b and fix the base portion 20a of the lens holder 20 to the shaft 22. Instead of the adhesive agent 23, the base portion 20a may be fixed to the shaft 22 by means of a screw. In either telephotography or wide angle photography, the lens frame 16 is moved along the guide rods 12 and 14 to focus the taking lens system.

Figure 4:
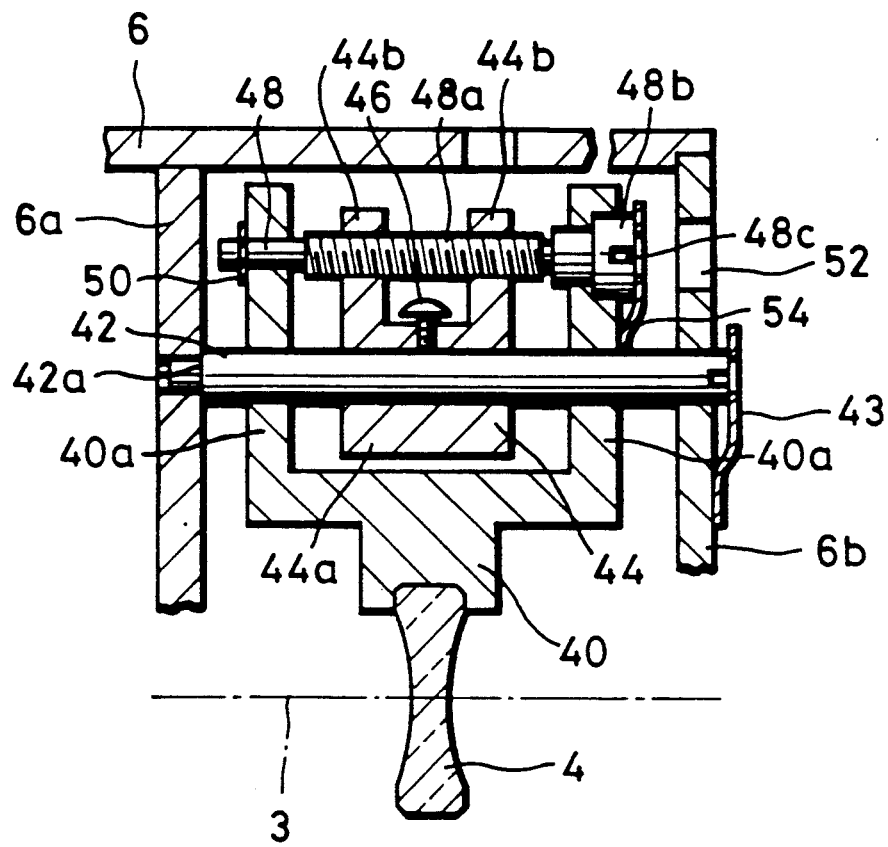
FIG. 4 is a cross sectional view showing the main part of a focus adjusting device for an auxiliary lens system according to another embodiment of this invention, wherein the lens holder is moved parallel to the photo-taking optical axis by rotating an adjusting rod.

FIG. 4 shows another embodiment of the auxiliary lens focus adjustment system, wherein elements similar to those shown in FIG. 3 are represented by using identical reference numerals. A lens holder 40 holding the auxiliary lens system 4 at one side has two forks 40a at the other side. The two forks are slidably fitted on a rotary shaft 42. The shaft 42 is rotatably supported between the wall 6a and the lid 6b of the movable lens barrel 6, while being maintained motionless in the axial direction by means of a shoulder portion 42a of the shaft and a plate spring 43. Disposed between the two forks 40a is a guide member 44, that is shorter in length in the direction of the photo-taking optical axis 3 than the width of the gap between the forks 40a. The shaft 42 passes through member 44 and is fixed thereto by a set screw 46 that is screw-threadedly received in a central body portion 44a of member 44.

Two legs 44b projecting from the guide member 44 at its right and left sides are formed with female threads which are in mesh with a male thread 48a formed on the intermediate portion of an adjusting rod 48. This adjusting rod 48 is rotatably supported at its opposite end portions by the forks 40a of the lens holder 40 which also hold it motionless in the axial direction. In order to prevent axial displacement, the adjusting rod 48 has at its one end portion a larger diameter portion 48b which abuts against a shoulder formed in the fork 40a, and a plate spring 54 presses against the end face of the larger diameter portion 48b. A slot 48c is formed in the end face of the larger diameter portion 48b to receive the tip of a tool therein. A hole 52 is formed in the lid 6b through which a tool is inserted, and a registering hole is formed in the plate spring 54. Reference numeral 50 represents a snap ring that bears against fork 40a to maintain rod 48 motionless in the other axial direction.

In the telephotography mode, the shaft 42 is rotated by a focal length changeover mechanism. This rotation force applied to the shaft 42 is transmitted via the guide member 44 and the adjusting rod 48 to the forks 40a of the lens holder 40. Accordingly, the lens holder 40 is swung upon rotation of the shaft 42 to cause the auxiliary lens system 4 to enter the photo-taking optical axis 3.

To assemble the taking lens, the shaft 42 is first inserted in the forks 40a and the central body portion 44a of the guide member 44, and the guide member 44 is fixed to the shaft 42 by means of the set screw 46. By rotating the adjusting rod 48, it is inserted next into the forks 40a and threaded through the guide member 44. After mounting the front end portion of the shaft 42 in the wall 6a of the movable lens barrel 6 and the rear end portion thereof in the lid 6b, the lid 6b is fixed to the movable lens barrel 6.

After assembling the taking lens system, focal point adjustment is carried out for the wide angle photography and telephotography modes as discussed above. For the focal point adjustment for the telephotography mode, a tool is inserted into the slot 48c of the adjusting rod 48 to rotate it in a desired direction. Since the adjusting rod 48 is in mesh with the guide member 44, the adjusting rod 48 moves backward or forward relative to the guide member 44 when the adjusting rod 48 rotates. On the other hand, since the adjusting rod 48 is supported between the forks 40a of the lens holder 40, the lens holder 40 also moves along the shaft 42 following the displacement of the adjusting rod 48. By moving the lens holder 40 parallel to the photo-taking optical axis 3 in the above manner, the auxiliary lens system 4 is set at the reference lens position such that an object at a predetermined distance is focussed correctly by the auxiliary lens system 4 and main lens system 2. After the auxiliary lens system 4 is correctly set at the reference lens position, the guide member 44 is fixed to the adjusting rod 48, or the forks 40a are fixed to the shaft 42, by means of adhesive agent or the like.

Figure 6:
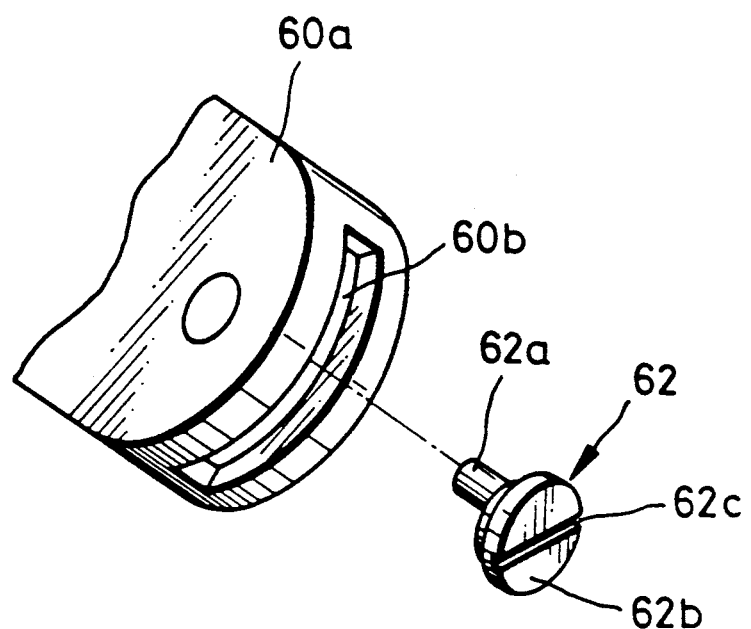
FIG. 6 is an exploded perspective view of the cam mechanism shown in FIG. 5.
Figure 7:
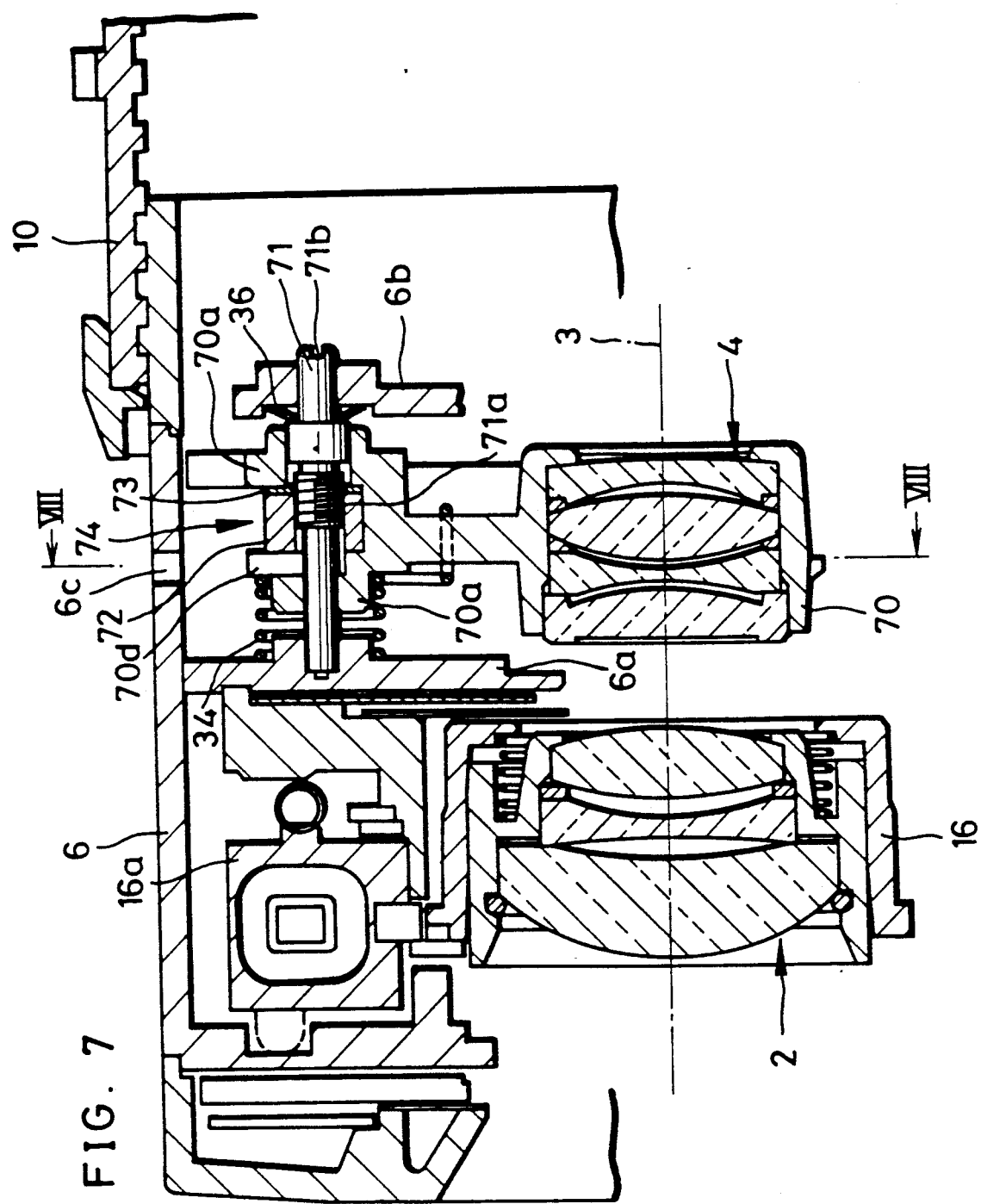
FIG. 7 is a cross sectional view showing another embodiment of this invention wherein an adjusting nut is coupled to a lens holder.

FIGS. 5 and 6 show another embodiment of the focus adjusting device, wherein elements similar to those shown in the embodiment of FIG. 3 are represented by using identical reference numerals. A lens holder 60 holding the auxiliary lens system 4 has its base portion 60a rotatably and slidably mounted on a support rod 61. There is formed on the outer peripheral surface of base portion 60a a cam groove 60b which forms a straight line when developed on a plan view. Fitted in this cam groove 60 is an eccentric pin 62a of an adjusting member 62 rotatably mounted on the movable lens barrel 6. The head portion 62b of the adjusting member 62 is pressed inward by a plate spring 63 to prevent it from being removed from the movable lens barrel 6. A slot 62c is formed in the head portion 62b into which the tip of a tool can be inserted.

To assemble the focus adjusting device 64, the auxiliary lens system 4 is first mounted on the lens holder 60. Then the support rod 61 is inserted through the base portion 60a of the lens holder 60. The support rod 61 is supported between the wall 6a and the lid 6b of the movable lens barrel 6, which fix it against motion in its axial direction. The adjusting member 62 is mounted on the outer surface of the movable lens barrel 6, and the eccentric pin 62a is fitted into the cam groove 60b of the lens holder 60. The adjusting member 62 is then pressed inward by application of the press spring 63.

As discussed previously, after completion of the focus adjustment for the wide angle photography mode, the taking lens system is set in the telephotography mode position by the focal length changeover mechanism. In the telephotography mode, the movable lens barrel 6 projects out of the camera body 8, and the lens holder 60 is swung about the support rod 61 by means of the driver spring 34 thereby to move the auxiliary lens system 4 into the photo-taking optical axis 3. When a tool is applied to the adjusting member 62 and rotated, the eccentric pin 62a in engagement with the cam groove 60b rotates about the center of the adjusting member 62 so that the lens holder 60 is caused to slide along the support rod 61. After the auxiliary lens system 4 is set in the reference lens position with an object at the predetermined distance in focus, the adjusting member 62 is fixed to the movable lens barrel 6 by means of adhesive agent or the like. Also in this embodiment, the force applied to the adjusting member 62 by a tool does not act on the lens holder 60 parallel to the photo-taking optical axis, thereby ensuring correct focus adjustment.

Although the cam groove 60b is formed in the lens holder 60, there may be formed a recess with its end wall in engagement with the eccentric pin 62a. In this case, it is necessary to ensure the contact of the recess end wall with the eccentric pin 62a when the auxiliary lens system 4 enters the photo-taking optical axis 3 for the telephotography mode. Furthermore, in place of the eccentric pin 62a, there may be used a cam groove which forms an arcuate line in a developed plan view, and a pin movable in the axial direction of the support rod 61 upon actuation of an adjusting member.

FIGS. 7 to 10 show another embodiment of the focus adjusting device. A shaft 71 substantially in parallel with the photo-taking optical axis 3 is supported at its opposite ends between the wall 6a and lid 6b, and is rotatable with respect to the movable lens barrel 6 but motionless in the axial direction. A male thread 71a is formed on the intermediate portion of the rotary shaft 71, the male thread being in mesh with an adjusting nut 72. A slot 71b is formed in the end of the shaft 71 to receive a tool.

A lens holder 70 holding the auxiliary lens system 4 is formed with forks 70a which are slidably mounted on the shaft 71. The adjusting nut 72 is disposed between the forks 70a, and a friction washer 73 is fitted on the shaft 71 in order to absorb any play between the forks 70a and the adjusting nut 72. The total width of the friction washer 73 and adjusting nut 72 is equal to the distance between the opposing inner surfaces of the two forks 70a.

Figure 8:
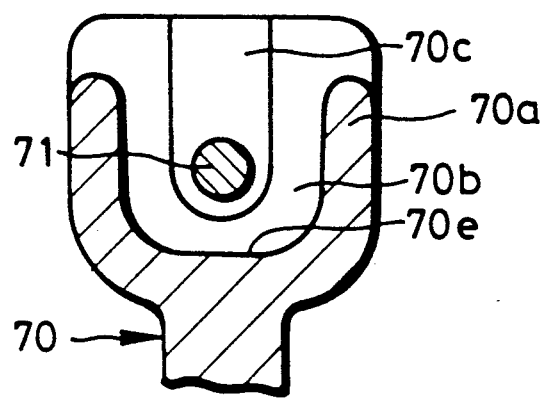
FIG. 8 is a cross sectional view showing a part of the base portion of the lens holder shown in FIG. 7, taken along line VIII—VIII of FIG. 7.

As shown in FIG. 8, the inner surface of one of the two forks 70a is stepped, having two surfaces 70b and 70c. The surface 70b is in tight contact with the side surface of the adjusting nut 72, and the surface 70c forms a suitable clearance with respect to the surface 70b. The clearance between the surfaces 70b and 70c constitutes an injection hole 70d through which adhesive agent is injected. The inner surface of the other of the two forks 70a is in tight contact with the friction washer 73.

Figure 9:
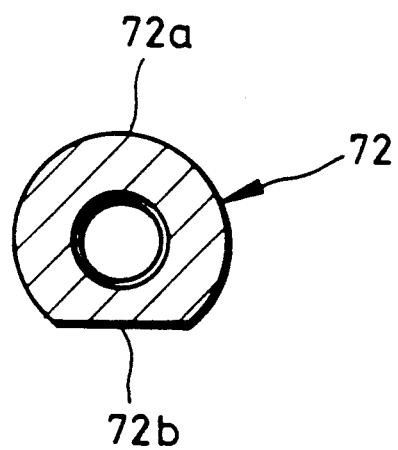
FIG. 9 is a cross sectional view of the adjusting nut shown in FIG. 7.

As shown in FIG. 9, the outer periphery of the adjusting nut 72 includes an arcuate surface portion 72a and a flat surface portion 72b. The flat surface portion 72b is in contact with a flat surface portion 70e of the lens holder 70 so as to prevent the adjusting nut 72 from rotating.

Figure 10:
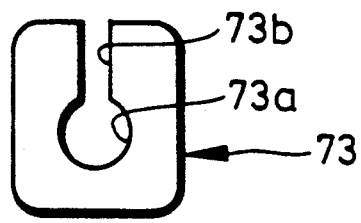
FIG. 10 is a plan view of the friction washer shown in FIG. 7.

As shown in FIG. 10, the friction washer 73 is formed with an opening portion 73a in the central area thereof and a cut portion 73b. The opening portion 73a has substantially the same diameter as the bottom of the male thread 71a of the shaft 71 to allow the male thread 71a to be fittingly engaged with the shaft 71.

To assemble the focus adjusting device 74, the adjusting nut 72 is placed between the two forks 70a of the lens holder 70, and the shaft 71 is inserted therethrough. The shaft 71 is rotated to move the adjusting nut 72 to a suitable position. Thereafter, the friction washer 73 is mounted on the shaft 71. After the driver spring 34 and plate spring 36 are mounted on the shaft 71, the shaft 71 is supported between the wall 6a and lid 6b.

Focus adjustment of the auxiliary lens system 4 is carried out by rotating the shaft 71 by using a tool. In this case, the shaft 71 will not move in the axial direction and the adjusting nut 72 will not rotate, so that the adjusting nut 72 moves forward or backward along the shaft 71 depending on the direction of rotation of the shaft 71. Since the adjusting nut 72 is clamped between the forks 70a of the lens holder 70, the adjusting nut 72 as well as the lens holder 70 moves parallel to the photo-taking optical axis 3. After the auxiliary lens system 4 is set in the reference lens position, adhesive agent is injected into the injection hole 70d to integrally fix together the shaft 71, the adjusting nut 72 and the forks 70a. Also in this embodiment, the force applied by the tool does not act upon the lens holder 70 in the axial direction so that proper focus adjustment is possible.

If it is desired to check the focus adjustment condition of the main lens system 2 by withdrawing the auxiliary lens system 4 from the photo-taking optical axis 3 prior to fixing the focus adjusting device of the auxiliary lens system 4, then the lens holder 70 is swung. In this case, the adjusting nut 72 and the shaft 71 are interconnected by the friction washer 73 and so the adjusting nut 72 will not rotate relative to the shaft 71 and the position of the auxiliary lens system 4 will not be displaced. For the focal length changeover, the lens holder 70 is swung together with the shaft 71 by the driver spring 34 so that the auxiliary lens system 4 is inserted into or withdrawn from the photo-taking optical axis 3.

Figure 11:
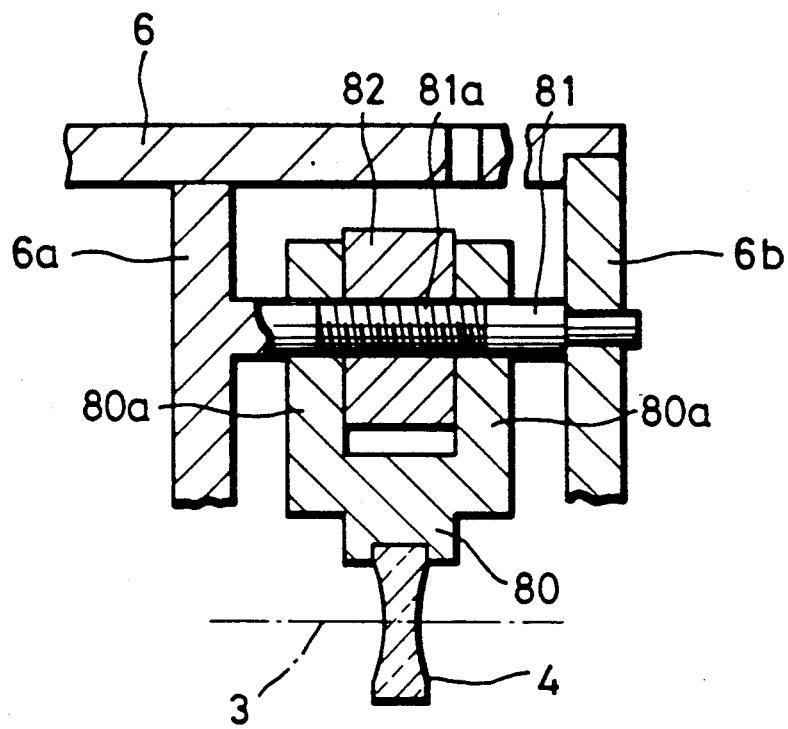
FIGS. 11 and 12 are cross sectional views showing modifications of the embodiment shown in FIG. 7.

FIG. 11 shows another embodiment of the focus adjusting device wherein focus adjustment is effected by the rotation of an adjusting nut. A stationary rod 81 is formed integrally with the wall 6a of the movable lens barrel 6. A male thread 81a formed on the intermediate portion of the stationary rod 81 meshes with an adjusting nut 82. Forks 80a of a lens holder 80 are rotatably and slidably mounted on the stationary rod 81, the adjusting nut 82 being clamped between the forks 80a. For position adjustment of the auxiliary lens system 4, the adjusting nut 82 is rotated so that the adjusting nut 82 and lens holder 80 are moved parallel to the photo-taking optical axis 3. Upon completion of the focus adjustment, the adjusting nut 82 is fixed to the stationary rod 81 by means of adhesive agent. The auxiliary lens system 4 is inserted into or withdrawn from the photo-taking optical axis 3 by swinging the lens holder around the stationary rod 81.

Figure 12:
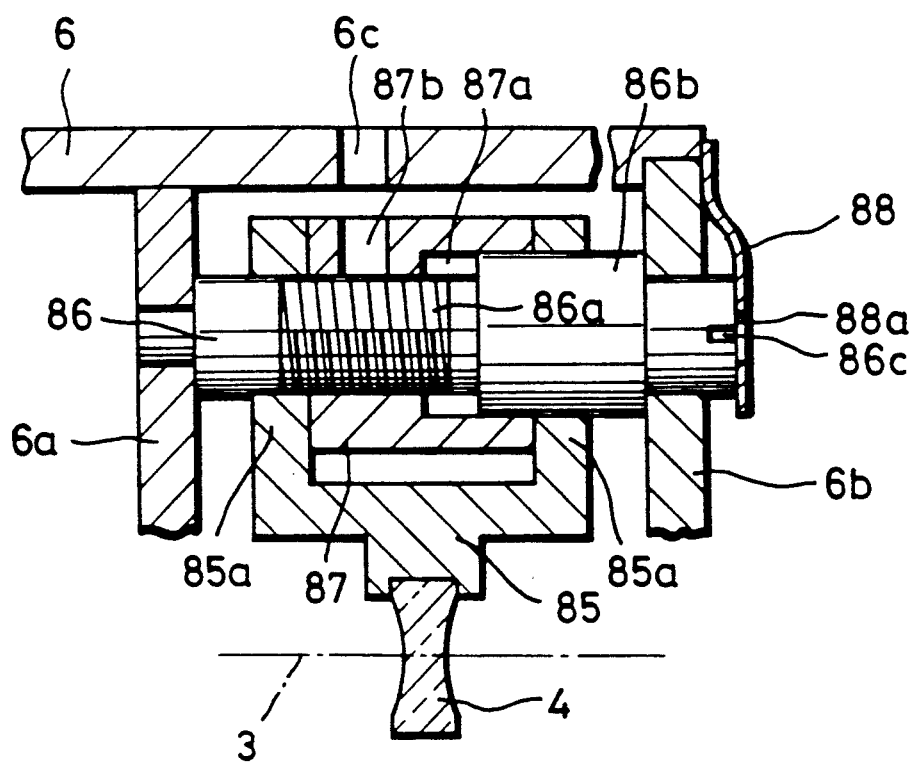

FIG. 12 shows another embodiment of the focus adjusting device wherein the position adjustment of the lens holder 85 is effected through the rotation of either a rotary shaft 86 or an adjusting nut 87. On the intermediate portion of the shaft 86, there is formed a male thread 86a with which a female thread of an adjusting nut 87 is in mesh. A larger diameter portion 86b of the shaft 86 is fitted in a recess 87a formed in the adjusting nut 87. The adjusting nut 87 is mounted between two forks 85a for rotation with respect to the shaft 86. Reference 87b represents an injection hole, and reference 86c represents a tool slot. A plate spring 88 absorbs any play of the shaft 86 in the axial direction.

For focus adjustment in the telephotography mode, a tool is inserted through a hole 88a in the plate spring 88 and inserted in slot 86c of the shaft 86 and turned to rotate it. Upon rotation of the shaft 86, the adjusting nut 87 as well as the lens holder 85 moves along the shaft 86. After setting the auxiliary lens system 4 in the reference lens position, adhesive agent is injected into the injection hole 87b to fix the adjusting screw 87 to the shaft 86. As also in the embodiment of FIG. 11, the adjusting nut 87 between the two forks 85a may be rotated to move the lens holder 85. For the focal length changeover, the lens holder 85 is swung around the shaft 86 to insert or withdraw the auxiliary lens system 4 into or from the photo-taking optical axis 3. If the adjusting nut 87 and lens holder 85 are both fixed to the shaft 86 by means of adhesive agent, both the shaft 86 and the adjusting nut 87 rotate in unison around the center of the shaft 86.

In the above embodiment, although the taking lens is constructed as having one auxiliary lens system, it may include two or more auxiliary lens systems. One or more of the auxiliary lens systems may be selected and inserted into the photo-taking optical axis to effect changeover between three or more different focal lengths. Furthermore, the present invention may be applied to the focus adjusting device for a main lens system alone.

Although the present invention has been fully described by way of preferred embodiments thereof with reference to the accompanying drawings, various changes and modifications within the scope and spirit of the invention will be apparent to those skilled in the relevant technical field. Thus, the invention should be considered as being limited only by the scope of the appended claims.

What is claimed is:

1. A variable focal length camera that changes the focal length of a taking lens by inserting or withdrawing an auxiliary lens system into or from a photo-taking optical axis along which a main lens system is disposed, comprising:
   a shaft extending substantially in parallel with said photo-taking optical axis, said shaft being mounted on said camera for rotation relative to said camera but being fixed against movement relative to said camera in the direction of said photo-taking optical axis;
   a lens holder for supporting said auxiliary lens system, a base portion of said lens holder being formed with a female thread;
   a male thread formed on an intermediate portion of said shaft and meshing with said female thread of said lens holder rotation of said shaft serving to move said lens holder relative to said taking lens in the direction of said photo-taking optical axis for focus adjustment; and
   means for fixing said lens holder to said shaft after said focus adjustment so as to prevent the position of said lens holder relative to said shaft from being changed, said shaft and lens holder thereafter turning in unison about the axis of said shaft for changing said focal length.

2. A variable focal length camera according to claim 1, wherein said shaft is formed at its one end with a slot into which a tool can be inserted for rotating the shaft.

3. A variable focal length camera according to claim 1, wherein said fixing means includes a hole extending from an outer periphery of said base portion to said female thread for receiving an adhesive agent to be injected into said hole.

4. A variable focal length camera according to claim 1, further comprising a driver spring for urging said lens holder to swing about said shaft, said driver spring surrounding said shaft.

5. A variable focal length camera according to claim 2, and a plate spring that presses the shaft in the same direction as a said tool so as to absorb play between said shaft and fixed portions of said camera rotatably supporting said shaft at its opposite end portions.

6. A variable focal length camera that changes the focal length of a taking lens by inserting or withdrawing an auxiliary lens system into or from a photo-taking optical axis along which a main lens system is disposed, comprising:
   a support rod extending substantially in parallel with said photo-taking optical axis, said support rod being fixed against movement relative to said camera in the direction of said photo-taking optical axis;
   a lens holder for supporting said auxiliary lens system, a base portion of said lens holder being slidably mounted on said support rod;
   a cam groove formed on an outer periphery of said base portion; and
   a rotatable adjusting member having a pin in engagement with said cam groove, rotation of said adjusting member serving to move said lens holder relative to said taking lens in the direction of said photo-taking optical axis for focus adjustment.

7. A variable focal length camera according to claim 6, wherein said adjusting member rotates around an axis perpendicular to the longitudinal direction of said support rod.

8. A variable focal length camera according to claim 6, and means to fix said adjusting member so as not to rotate after said focus adjustment.

9. A variable focal length camera according to claim 8, further comprising a driver spring mounted around said support rod, said lens holder being urged to swing about the center of said support rod by a force exerted by said driver spring.

10. A variable focal length camera that changes focal length of a taking lens by inserting or withdrawing an auxiliary lens system into or from a photo-taking optical axis along which a main lens system is disposed, comprising:
- a shaft extending substantially in parallel with said photo-taking optical axis, said shaft being mounted on said camera for rotation relative to said camera but being fixed against movement relative to said camera in the direction of said photo-taking optical axis;
- a lens holder for supporting said auxiliary lens system, a base portion of said lens holder being formed with two forks through which said shaft passes;
- an adjusting rod rotatably supported at its opposite end portions by distal end portions of said two forks to hold said adjusting rod motionless in the axial direction, there being a male thread on an intermediate portion of said adjusting rod;
- a guide member positioned between said two forks, fixedly connected to said shaft, and in mesh with said male thread of said adjusting rod, said guide member moving said lens holder relative to said taking lens along said shaft when said adjusting rod is rotated for focus adjustment; and
- means for fixing the position of said lens holder relative to said shaft after said focus adjustment, said shaft and said lens holder thereafter turning in unison about the axis of said shaft for changing said focal length.

11. A variable focal length camera according to claim 10, wherein said adjusting rod is formed at its one end with a slot into which a tool can be inserted for rotating said adjusting rod.

12. A variable focal length camera that changes the focal length of a taking lens by inserting or withdrawing an auxiliary lens system into or from a photo-taking optical axis along which a main lens system is disposed, comprising:
- a shaft extending substantially in parallel with said photo-taking optical axis, said shaft being fixed against movement relative to said camera in the direction of said photo-taking optical axis, there being a male thread on an intermediate portion of said shaft;
- a lens holder swingably mounted on said shaft and supporting said auxiliary lens system; and
- an adjusting nut meshing with said male thread and coupled to said lens holder said adjusting nut and said lens holder moving relative to said taking lens in unison in the direction of said photo-taking optical axis when said adjusting nut and said shaft are rotated relative to each other.

13. A variable focal length camera according to claim 12, wherein said lens holder is formed with two forks sandwiching said adjusting nut therebetween, said shaft passing through said forks.

14. A variable focal length camera according to claim 12, wherein said shaft is fixed so as not to be rotatable, and said adjusting nut is rotatable relative to said shaft to effect said focus adjustment.

15. A variable focal length camera according to claim 12 wherein said shaft is rotatable to effect said focus adjustment.

16. A variable focal length camera according to claim 15, wherein said shaft is formed at its one end with a slot that receives a tool to rotate said shaft.

17. A variable focal length camera according to claim 12, further comprising means for fixing the position of said lens holder relative to said shaft after focus adjustment by movement of said adjustment nut, said lens holder and said shaft and adjusting nut thereafter turning in unison around the center of said shaft.

18. A variable focal length camera according to claim 17, wherein said fixing means comprises means to receive an adhesive agent for securing said adjusting nut and said shaft together.

19. A variable focal length camera, having a frame, that changes the focal length of a taking lens by inserting or withdrawing an auxiliary lens system into or from a photo-taking optical axis along which a main lens system is disposed, comprising:
- a shaft extending substantially in parallel with said photo-taking optical axis, said shaft being fixed against movement relative to said camera in the direction of said photo-taking optical axis;
- a lens holder for supporting said auxiliary lens system, one end portion of said lens holder being mounted on said shaft; and
- focus adjusting means for setting said auxiliary lens system at a reference lens position, said focus adjusting means moving said lens holder along said shaft to effect focus adjustment, said focus adjusting means comprising a rotatable member having a tool-receiving formation thereon mounted on the camera such that when a tool is received by said formation and exerts thrust against said member in a direction along the axis of rotation of the member said thrust is transmitted directly to said frame, said member having cam means thereon acting on said auxiliary lens system and causing said auxiliary lens system to move relative to said taking lens in the direction of said photo-taking optical axis without imposing directly on said auxiliary lens system any adjusting force exerted by said tool on said focus adjusting means in the direction of said photo-taking optical axis.

20. A camera as claimed in claim 19, wherein said rotatable member has an axis of rotation perpendicular to said optical axis and has an eccentric portion thereon that engages rotatably with said auxiliary lens system to move said auxiliary lens system along said optical axis upon rotation of said rotatable member.

21. A camera as claimed in claim 19, wherein said rotatable member is a screw that has screw-threaded engagement with said auxiliary lens system.

22. A variable focal length camera that changes the focal length of a taking lens by inserting or withdrawing an auxiliary lens system into or from a photo-taking optical axis along which a main lens system is disposed, said camera having a frame comprising:
- focus adjusting means mounted in the camera for setting said auxiliary lens system at a reference lens position in which an object at a predetermined distance is in focus, said focus adjusting means comprising a rotatable member having a tool-receiving formation thereon mounted on the camera such that when a tool is received by said formation and exerts thrust against said member in a direction along the axis of rotation of the member said thrust is transmitted directly to said frame, said member having cam means thereon acting on said auxiliary lens system and causing said auxiliary lens system to move relative to said taking lens in the direction of said photo-taking optical axis without imposing directly on said auxiliary lens system any adjusting force exerted by said tool on said focus adjusting means in the direction of said photo-taking optical axis.

23. A camera as claimed in claim 22, wherein said rotatable member has an axis of rotation perpendicular to said optical axis and has an eccentric portion thereon that engages rotatably with said auxiliary lens system to move said auxiliary lens system along said optical axis upon rotation of said rotatable member.

24. A camera as claimed in claim 22, wherein said rotatable member is a screw that has screw-threaded engagement with said auxiliary lens system.

* * * * *